(12) United States Patent
Marzocchi et al.

(10) Patent No.: US 6,328,291 B1
(45) Date of Patent: Dec. 11, 2001

(54) SHOCK ABSORBER

(75) Inventors: Adriano Marzocchi, Bologna; Loris Vignocchi, Zola Predosa; Sandro Musiani, Marzabotto, all of (IT)

(73) Assignee: Marzocchi, S.p.A., Bologna (IT)

( * ) Notice: Subject to any disclaimer, the term of this patent is extended or adjusted under 35 U.S.C. 154(b) by 0 days.

(21) Appl. No.: 09/536,353

(22) Filed: Mar. 27, 2000

Related U.S. Application Data

(63) Continuation of application No. 08/992,752, filed on Dec. 17, 1997, now Pat. No. 6,042,091.

(30) Foreign Application Priority Data

Dec. 19, 1996 (IT) .............................................. BO96A0669

(51) Int. Cl.[7] ...................................................... F16F 9/14
(52) U.S. Cl. ...................... 267/64.15; 188/285; 188/317; 188/322.22; 267/64.26; 267/221
(58) Field of Search ............................... 267/64.15, 64.26, 267/221, 218, 131, 64.12, 226, 34; 280/275–283; 188/299.1, 269, 281, 282.9, 319.1, 319.2, 32.19, 317, 285, 322.22, 314–318, 280, 300; 244/104 FP

(56) References Cited

U.S. PATENT DOCUMENTS

| | | | |
|---|---|---|---|
| 4,807,860 | * | 2/1989 | Simons . |
| 5,195,766 | * | 3/1993 | Dohrmann et al. . |
| 5,275,264 | * | 1/1994 | Isalla . |
| 5,284,352 | * | 2/1994 | Chen . |
| 5,310,203 | * | 5/1994 | Chen . |
| 5,346,236 | * | 9/1994 | Ohma . |
| 5,350,185 | * | 9/1994 | Robinson . |
| 5,445,401 | * | 8/1995 | Bradbury . |
| 5,449,188 | * | 9/1995 | Ohma . |
| 5,456,480 | * | 10/1995 | Turner et al. . |
| 5,478,099 | * | 12/1995 | Kawahara . |
| 5,580,075 | * | 12/1996 | Turner et al. . |
| 5,634,652 | * | 6/1997 | Tsai . |
| 5,702,092 | * | 12/1997 | Farris et al. . |
| 5,725,226 | * | 3/1998 | Pariente . |
| 5,848,675 | * | 12/1998 | Gonzalez . |
| 6,042,091 | * | 3/2000 | Marzocchi et al. ............... 267/64.15 |

* cited by examiner

*Primary Examiner*—Douglas C. Butler
(74) *Attorney, Agent, or Firm*—Ward & Olivo

(57) ABSTRACT

The present invention relates to a hydropneumatic shock absorber. This new telescopic system comprises an outer sliding tube, an inner sliding tube and structure for adjusting the braking level of the shock absorber in expansion. Fastened on the base of the outer sliding tube is the bottom of a barrel on which rests an elastic structure, such as a counter-acting spring, which pushes on the inner sliding tube in the expansion stroke. The inner sliding tube carries at its internal end a bell which cooperates with a stop spring when in the expansion stroke. The liquid filled barrel contains an axially movable piston connected to the closure plug assembly with the piston contains a first valve, which opens only in the compression phase, and a second valve, which acts as variable throttle and is controlled by the padded end of a screw axially placed within the support tube. By acting on a screw, the expansion braking level of the shock absorber can be adjusted.

65 Claims, 4 Drawing Sheets

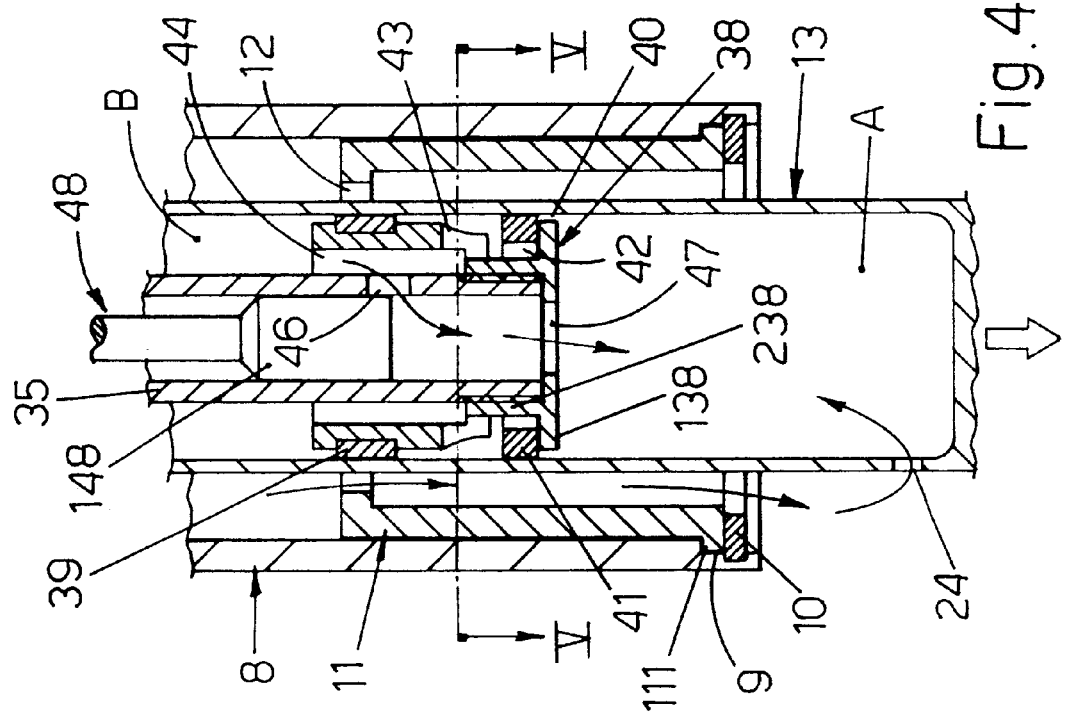
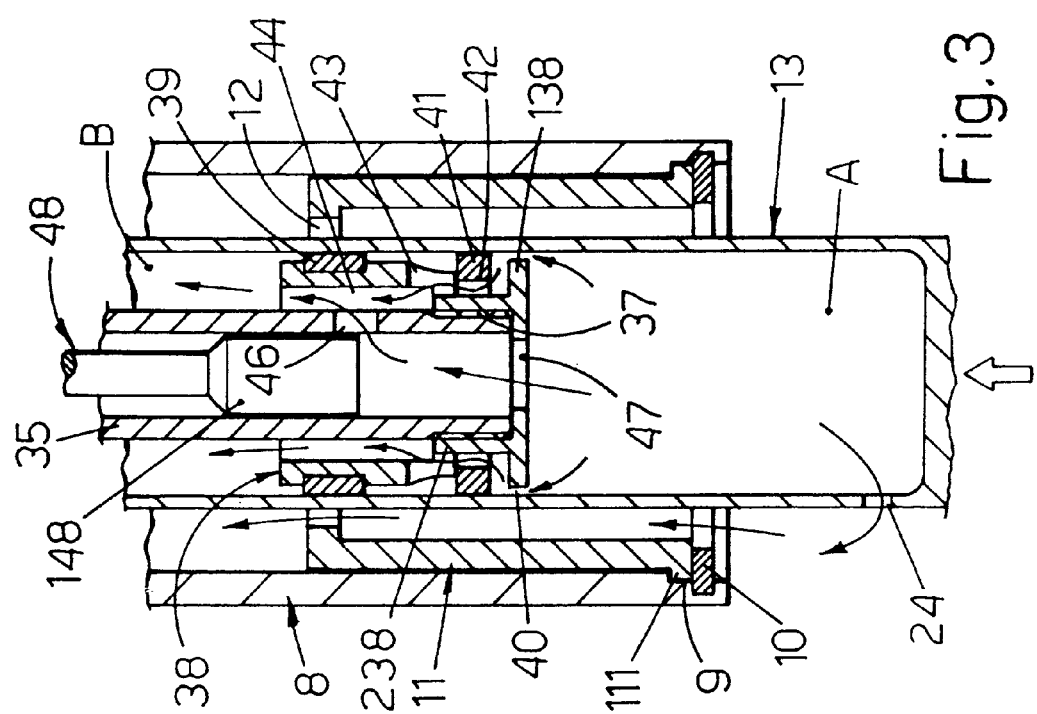

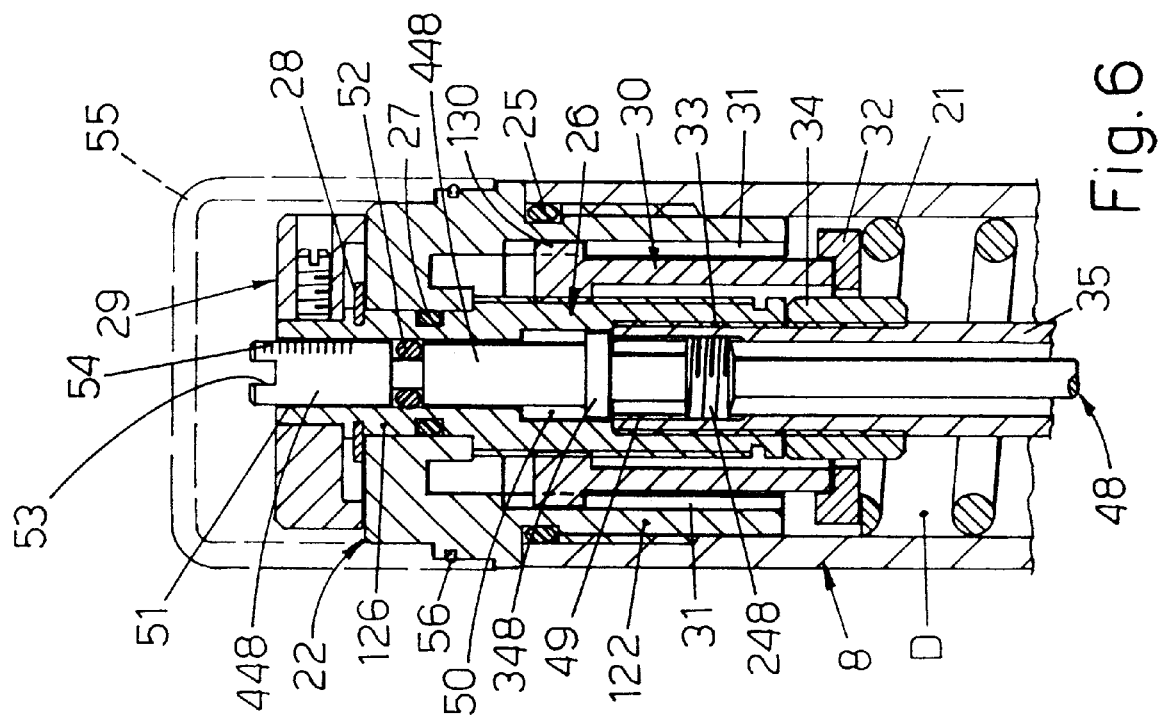
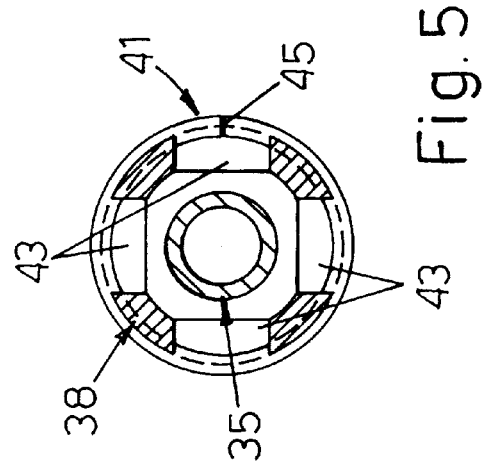

SHOCK ABSORBER

This Appln is a continuation of Ser. No. 08/992,752 filed Dec. 17, 1997 now U.S. Pat. No. 6,042,091.

BACKGROUND OF THE INVENTION

The present invention relates to a hydropneumatic shock absorber, adjustable in the braking level in expansion, particularly intended to form, in combination with an equal shock absorber, the telescopic legs of a fork for mountain-bikes, trail-bikes or other bikes or motorbikes.

BRIEF DESCRIPTION OF THE DRAWINGS

The characteristics of the invention, and the advantages deriving from it, will appear evident from the following description of a preferred embodiment of the same, illustrated by way of example in the Figures of the attached drawings, in which:

FIGS. 3 and 4 illustrate enlarged and longitudinally sectioned as in the preceding figures, the portion of the shock absorber equipped with adjustable valve means, respectively in the compression phase and in the expansion phase;

FIG. 5 illustrates some details according to section line V—V of FIG. 4;

FIG. 6 illustrates, longitudinally sectioned and enlarged, the upper part of the inner sliding tube of the shock absorber shown in FIGS. 1 and 2.

DETAILED DESCRIPTION OF THE INVENTION

Figure 1:
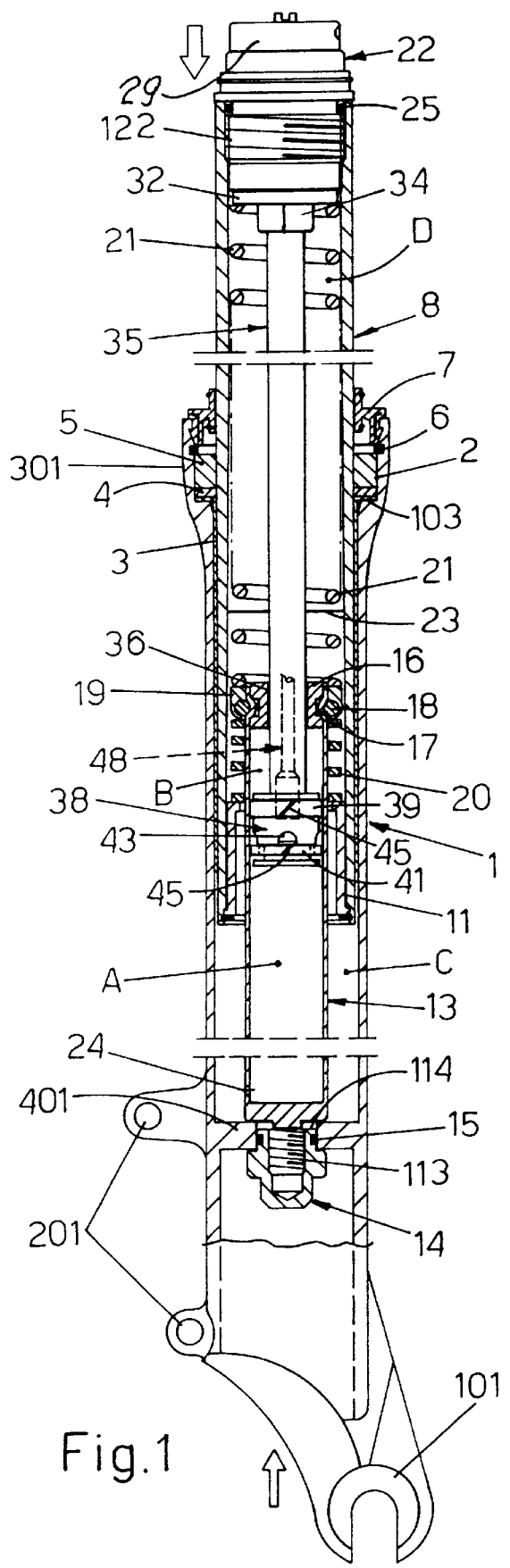
FIGS. 1 and 2 illustrate the shock absorber sectioned lengthwise, respectively in the expanded position and in the compressed position.
Figure 2:
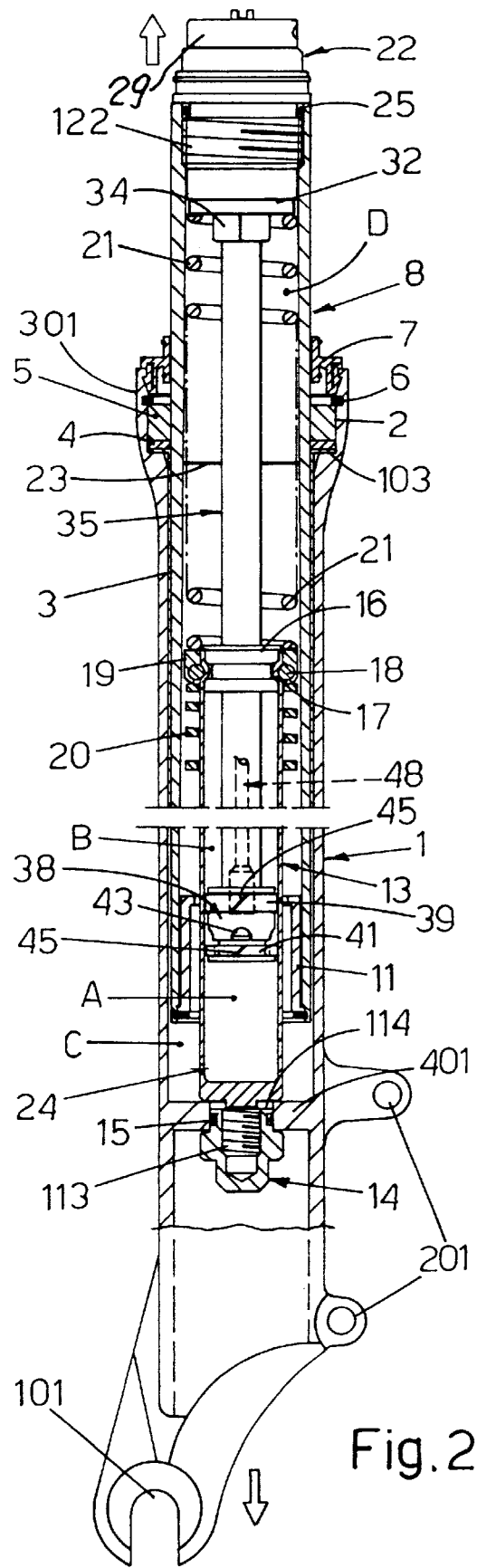

In FIGS. 1 and 2, 1 outer sliding tube of the shock absorber is equipped for the formation of a stem of a fork for mountain-bike, in the lower part with a fork appendix 101, for the fastening to the axis of the front wheel of the bike and is possibly equipped with additional appendices 201 for the support a disc brake caliper. The outer sliding tube 1 in the upper part ends with an extended portion 301 with a seat 2 having a diameter greater than that of the internal cavity of the outer sliding tube itself and on the bottom of such seat rests the annular neck 103 of a thin bushing 3 made of "Teflon" (registered trademark) or of other suitable material with a low friction coefficient which is highly wearproof, which covers the cavity of the outer sliding tube for an adequate length (see further on). On the neck 103 of said bushing 3 is positioned a washer 4 of suitable material, surmounted by a sealing ring 5 which is blocked in seat 2 by means of a snap ring 6. Seat 2 is then pre-set to restrain a closing ring 7 with internal parts having the function of dust scraper.

In the cavity of the outer sliding tube 1 there is mounted axially sliding and with lateral seal, through the above mentioned bushing 3, the round section inner sliding tube 8, which by its upper end is fastened to the non illustrated cross-bar, integral with the inner sliding tube of a telescopic system equal and parallel to the one in question and which carries the steering axis. A damping cartridge comprising at least a piston 38, barrel 13, and a support tube 35 is utilized. The lower end of the inner sliding tube 8 is internally equipped with an annular recess 9 (see also FIGS. 3 and 4) in which stays and is axially blocked by the snap ring 10 and the annular neck 111 of a bell 11, and which is open in the upper part and traversed, with the clearance 12, by a round section small cylindrical tube. or barrel 13 is made with a suitable light alloy and provided in one piece, on the bottom, with a threaded axial shank 113 screwed in a cap nut 14 which in turn is equipped with a truing threaded axial shank 114 which engages with precision and with lateral seal, through the gasket 15, a hole obtained at the centre of the raised base 401 of the outer sliding tube 1. The outer sliding tube 1 is open at the lower end to allow access to the base 401 to the nut 14. The barrel 13 is closed in the upper part by a plug 16 laterally equipped with an annular recess 17 in which a corresponding lateral portion of the barrel 13 is headed. In such annular recess 17 is set an open snap ring 18, on which a cap 19 is rested in the upper part and rimmed in the lower part. Against the lower end of such cap rests the end of a helical spring 20 which with the other end rests against the top of the lower bell 11 of the inner sliding tube 8 when this is in the position of maximum expansion as from FIG. 1. The spring 20 is preferably made with a square or rectangular section. On the upper end of the cap 19 rests at least one helical counter-acting spring 21 which concerns the inner sliding tube 8 for its entire length and which is held in this by a plug 22 equipped with means for preloading this spring 21 whose function is to urge the inner sliding tube 8 in expansion and to absorb the compression stress to which the telescopic system in question is subjected by the roughness of the ground.

The bushing 3 placed between the outer sliding tube 1 and the inner sliding tube 8, is of such length is to guide the inner sliding tube 1 itself, but not such as to protrude in the lower part from it when the inner sliding tube itself is in the position of maximum expansion as from FIG. 1. This solution enables to considerably limit the thickness of the bushing 3 with economical and functional advantages and ensures that such bushing is always correctly held between the parts whose sliding and lateral seal it controls.

Before mounting the plug 22, which with its own externally threaded shank 122 is screwed in a corresponding internally threaded portion of the upper end of the outer sliding tube 1, in the outer sliding 1 tube itself there is introduced a correct amount of a suitable liquid which preferably goes over the cap 19, crossing the clearance existing between the cap itself and the internal lateral surface of the inner sliding tube 8, for example up to the line of the level indicated with 23 in FIG. 1 and such fluid completely fills the free chamber C of the outer sliding tube 1 and completely fills the barrel 13 in which it can flow through at least one lower hole 24 of suitable section. The plug 22 is equipped with a gasket 25 for the seal connection on the inner sliding tube (FIG. 6) and is axially drilled for the passage of the upper tapered section 126, with lateral seal 27, of a screw 26 which is axially held in place by a snap ring 28 and which can be actuated through an external knob 29. On screw 26 is screwed a nut screw 30 externally equipped with teeth 130 which bind some corresponding longitudinal recesses 31 of the lateral surface of the axial cavity of the plug in which lodges the said screw—nut screw group. On the lower end of the nut screw 30 rests with the interpositioning of a truing cap 32, the upper end of the counter-acting spring 21. By acting on the knob 29, it will be possible to rotate the screw 26 and determine the ensuing axial shifting of the nut screw 30 towards the bottom, preloading the spring 21 to the desired point. It is understood that on top of the plug 22 and on the knob 29 could be included some reference marks (not shown), to enable the user to modify at will the level of compression of the counter-acting springs of the fork, even without the use of special fixtures.

It can be seen from reviewing FIG. 6 that the adjustment screw 26 is equipped with an axial cavity subdivided in three sections with the diameter decreasing towards the top. The lower section 33 is threaded and in it there is screwed and axially blocked by means of the lock nut 34, the end of a tube 35. The tube 35 extends towards the bottom and passes through a hole 36 in the plug 16, entering the barrel 13 where it terminates with an externally threaded end 37 on which is screwed the bottom of the body of a small goblet-shaped piston 38. Piston 38 includes an external annular counter-bore with at least one gasket 39 which operates as a lateral seal against the barrel 13. The base 138 of the piston 38 has a diameter suitably lesser than the internal diameter of the barrel 13, so that between the two parts there is a permanent annular passage 40 of the right width. On the same base 138 is included a ring of suitable plastic material, which operates as a lateral seal against the barrel 13 and whose internal diameter is greater than the external diameter of the stem 238 of the piston 38, so that between the two parts there is a permanent annular passage 42. The height of the ring 41 is opportunely lesser than that of the stem of the piston 38, so that when the telescopic assembly in question is stressed by compression, as from FIG. 3, said ring 41 is lifted, it moves away from the base 138 and rests on the bottom of the body of the same piston where, as illustrated in the detail of FIG. 5, are opened some radial holes 43 which communicate with the toric cavity 44 existing between the same body of the piston 38 and the rod 35 which carries it. The ring 41 and the seal gasket 39 are made with a wearproof material, for instance with an appropriate relatively rigid and non elastic plastic material, which allows them to be lodged in their respective seats thus making the piston 38 in several pieces. Alternatively, they can be provided with an oblique cut 45, which forms flute spout ends, respectively inclined and which reciprocally overlap with good seal condition with respect to the barrel 13 (FIGS. 1 and 5).

In the cavity 44 of the piston 38 is opened at least one hole 46 obtained laterally in the tube 35. The base 138 of the same piston is axially provided with a hole 47. In the tube 35 there is located a rod 48 which ends in the lower part with a cylindrical head 148 fit to be located with an adjustable level of interference in front of said hole 46, so as to modify its passage port. For this purpose, the rod 48 is equipped in the upper part with the following means (see FIG. 6):

- a padded and threaded portion 248 which co-operates with a corresponding internally threaded section 49 of the upper extremity of the tube 35;
- an upper annular portion 348 which acts as counterboring for the screwing and unscrewing of said rod 48, in the co-operation respectively with the upper end of the tube 35 and with the top of the intermediate section 50 of the axial cavity of the screw 26;
- a terminal portion 448 which goes through the upper and lower diameter section of the axial cavity of the screw 26, which is equipped with a lateral seal gasket 52 and which protrudes from the top of the same screw with a section of the right length, equipped with an axial holding snap ring 28 and equipped at the end with a diametrical cut 53 to be activated with a screwdriver or other mean. By screwing and unscrewing the rod 48 within the limits allowed by the counterboring 348, it is possible to modify the passage port of the hole 46, up to the complete opening or complete closing of such hole.

In the compression phase of the shock absorber, as illustrated in FIGS. 1 and 3, the ring 41 is lifted against the bottom of the body of the piston 38 and the liquid contained in the lower chamber A of the barrel 13, flows in the upper chamber of the same barrel through the openings 40; 42, 43, 44, and also through the shunt represented by the hole 47, by the cavity of the rod 35 and by the passage of the hole 46. However, possible variations in the rate of flow of this last shunt do not appreciably modify the behaviour of the shock absorber. Since chamber A has a volume greater than that of chamber B, the exceeding liquid of the same chamber A flows in chamber C external to the barrel 13, through the lower hole 24 of the barrel 13. Given that in the compression phase, chamber C also decreases in volume, the liquid of this chamber flows through the opening 12 of the bell 11, goes through clearance present between the cap 19 and the internal lateral surface of the inner sliding tube 8 and raises the level 23 of the liquid in the chamber D partially occupied by air, which decreases in volume and is compressed with an elasticity which is added to that of the counter-acting spring 21 (see FIG. 2).

The compression phase of the shock absorber can be progressively stopped, by a gradual decrease in the clearance between the cap 19 and the inner sliding tube 8, determined by a correct internal taper of the same inner sliding tube, whereby the internal diameter of this component progressively decreases upwards, as illustrated in FIGS. 1 and 2.

In the expansion phase of the shock absorber, the liquid follows an inverse route to that previously considered. In this phase the ring 41 shifts downwards as from FIGS. 2 and 4 and by resting on the foot 138 of the plunger 38, closes the passage 40 so that the liquid can flow from the upper chamber B to lower one A of the barrel 13, exclusively through the shunt 44, 46, 47. By modifying the passage of the hole 46, by screwing or unscrewing the rod 48, it will be possible to change at will the level of braking in expansion of the shock absorber. To facilitate the adjustment carried out by means of the rod 48, on the upper part 448 of the same rod can be included some reference marks 54 which can be read when they protrude from the top of the screw 26, as illustrated in FIG. 6. In this same figure, reference numeral 55 and the broken lines indicate a possible protection cap which can be pressure mounted on the top equipped with lateral friction means 56 of the upper plug 22 of the inner sliding tube 8.

It is clear that, by unscrewing the screw nut 14 and the plug 22, it is possible to disassemble the shock absorber in all its components. By removing the snap ring 6 it will be possible to remove and replace the sliding bushing 3 when it is worn out.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. A shock absorber comprising at least one telescopic assembly, said telescopic assembly comprising:
   an inner sliding tube slidably engaged with lateral seal with an outer sliding tube, said inner sliding tube having an internal cavity;
   a damping cartridge positioned axially within said internal cavity; and
   an elastic means for providing expansion of said inner sliding tube with respect to said outer sliding tube;
   wherein said outer sliding tube comprises a first attachment means at a first end and an opening at a second end;

wherein said inner sliding tube comprises a second attachment means at a first end and an opening at a second end;

wherein said internal cavity has damping fluid located therein for damping compression or expansion of said telescopic assembly; and wherein said damping cartridge comprising first and second internal chambers, at least one opening for providing flow of said dampening fluid between said internal chambers, and at least one opening for providing flow of said damping fluid between said internal cavity of said inner sliding tube and said internal chambers of said damping cartridge during compression or expansion of said telescopic assembly.

2. A shock absorber according to claim 1, wherein said damping cartridge comprises a means for providing damping during compression of said telescopic assembly and a means for providing damping during expansion of said telescopic assembly.

3. A shock absorber according to claim 1, wherein said telescopic assembly further comprises a bushing positioned between said outer sliding tube and said inner sliding tube.

4. A shock absorber according to claim 3, wherein said bushing is made of smooth material.

5. A shock absorber according to claim 3, wherein said bushing is a low friction efficient material bushing.

6. A shock absorber according to claim 3, wherein said bushing comprises a plurality of holes.

7. A shock absorber according to claim 1, wherein at least one elastic means is positioned coaxially with said damping cartridge.

8. A shock absorber according to claim 7, wherein said elastic means is a spring.

9. A shock absorber according to claim 7, wherein said elastic means is an elastomer.

10. A shock absorber according to claim 1, wherein said telescopic assembly comprises first and second elastic means, wherein said first elastic means is a spring and a second elastic means is an elastomer.

11. A shock absorber according to claim 1, wherein said damping cartridge comprises:

a barrel having an internal chamber, said barrel being closed at a first end by a plug assembly and connected at a second end to said telescopic assembly;

a piston located within said internal chamber creating an upper and a lower chamber therein, said piston being slidably engaged with lateral seal with an inner wall of said internal chamber, said piston comprising valve means for controlling passage of dampening fluid between said upper chamber and said lower chamber;

a support tube connected to said piston on a first end and connected to said telescopic assembly on a second end, said support tube axially traversing said plug assembly; and at least one elastic element positioned coaxially with said support tube, said barrel and said piston;

wherein said damping fluid flows throughout said internal cavity and said internal chamber during compression or expansion of said shock absorber.

12. A shock absorber according to claim 11, wherein said elastic element is a spring.

13. A shock absorber according to claim 11, wherein said elastic element is an elastomer.

14. A shock absorber according to claim 11, wherein said shock absorber comprises both first and second elastic elements, wherein said first elastic element is a spring and said second elastic element is an elastomer.

15. A shock absorber according to claim 11, wherein a piston is attached to a first end of said adjustment rod.

16. A shock absorber according to claim 12, wherein a second end of said adjustment rod protrudes from said upper end of said telescopic assembly.

17. A shock absorber according to claim 11, wherein a internal region of said support tube has a rod axially position therein, a lower end of said rod having an enlarged section slidably engaged within said internal region of said support tube, an upper end of said rod having an enlarged threaded section extending through a corresponding internally threaded upper end of said telescopic assembly to provide a means for adjusting flow of damping fluid throughout said internal chamber of said barrel.

18. A shock absorber according to claim 11, wherein said telescopic assembly has low friction.

19. A shock absorber according to claim 11, wherein said piston comprises a stem which is provided with a threaded axial hole in which a threaded end of said support tube is screwed.

20. A shock absorber according to claim 19, wherein said threaded end has at least one lateral hole which externally communicates with said internal chamber of said barrel and which internally communicates with an internal region of said support tube.

21. A telescopic system for a shock absorber, said telescopic system comprising:

an outer sliding tube;

an inner sliding;

a damping cartridge comprising a barrel, a piston and a support tube;

an elastic member positioned coaxial within said internal chamber to stress said telescopic system in expansion; and dampening fluid substantially occupying said internal cavity and said internal chamber;

wherein said inner sliding tube is slidably engaged with said outer sliding tube such that said inner sliding tube and said outer sliding tube form an internal cavity;

wherein said barrel has at least one internal chamber closed at one end by a plug, said barrel having at least one opening at a lower end thereof;

wherein said piston is positioned within said barrel, said piston having at least one opening which opens during compression of said telescopic system and which closes during expansion of said telescopic system;

wherein said support tube connects said piston to said telescopic system; and wherein said fluid flows through said opening to slow compression and expansion of said telescopic system.

22. A telescopic system according to claim 21, wherein said barrel has a length proportional to a stroke of said telescopic system.

23. A telescopic system according to claim 21, wherein said barrel is closed on its upper end by a plug assembly axially traversed by said support tube.

24. A telescopic system according to claim 21, wherein said piston divides said internal chamber of said barrel into an upper chamber and a lower chamber.

25. A telescopic system according to claim 24, wherein said piston delimits said upper and lower chambers.

26. A telescopic system according to claim 24, wherein said lower chamber is in permanent communication via at least one opening with said internal cavity of said telescopic system.

27. A telescopic system according to claim 24, wherein said at least one opening controls flow of said dampening fluid between said upper and lower chambers.

28. A telescopic system according to claim 24, wherein said piston comprises at least one valve means which is open in compression of said telescopic system and closed in expansion of said telescopic system, and at least one valve means which is open in both compression and expansion of said telescopic system.

29. A telescopic system according to claim 28, wherein said valve means which is open in both compression and expansion of said telescopic system has a flow range which is adjustable by means of an adjustment screw positioned axially within said support tube.

30. A telescopic system according to claim 21, wherein said barrel comprises at its lower end with a lower shank for fastening said barrel axially and with lateral seal to a lower end of said telescopic system.

31. A telescopic system according to claim 21, wherein said plug assembly has an external annular recess on which rests said elastic member.

32. A telescopic system according to claim 21, wherein said piston is integrally connected via a bell cap to a lower end of said inner sliding tube.

33. A telescopic system according to claim 32, wherein a second elastic member is positioned coaxially around said barrel between said bell cap and said plug assembly such that it provides end-of-stroke expansion dampening of the telescopic system.

34. A telescopic system according to claim 21, wherein said plug assembly has an external diameter less than the inner diameter of said inner sliding tube.

35. A telescopic system according to claim 34, wherein the portion of said internal cavity within said inner sliding tube is tapered such that said inner diameter decreases toward an upper end of said inner sliding tube, wherein that space between the inner wall of said inner sliding tube and said plug assembly decreases during compression of said telescopic system.

36. A telescopic system according to claim 34, wherein said plug assembly has an external diameter such that said plug assembly slides guided on an internal surface of said inner sliding tube.

37. A telescopic system according to claim 36, wherein said plug assembly comprises openings for providing passage of said dampening fluid during expansion and compression of said telescopic system.

38. A telescopic system according to claim 21, wherein said piston cooperates with lateral seal with said barrel through at least one annular gasket mounted on said piston.

39. A telescopic system according to claim 21, wherein said piston is provided with a threaded axial hole to which said support tube is attached.

40. A telescopic system according to claim 21, wherein said support tube has a screw coaxially positioned therein, said screw being enlarged on its lower end, said enlarged lower end having at least one lateral hole which externally communicates with an internal cavity of said piston and said internal chamber of said barrel, and which internally communicates with an internal cavity of said support tube and said internal chamber of said barrel.

41. A telescopic system according to claim 40, wherein said inner sliding tube has on its upper end a plug assembly which is axially traversed with lateral seal by said screw.

42. A shock absorber comprising:
first and second sliding tubes slidably engaged with lateral seal, said sliding tubes having a first internal chamber therein substantially filled with a dampening fluid;
a damping cartridge comprising a support tube, a piston, and a second internal chamber therein substantially filled with said dampening fluid, said second internal chamber being formed on one end by a plug assembly, said second internal chamber having at least one opening at a lower end thereof, said piston being positioned integral with said second internal chamber, said piston having at least one valve means, and said support tube connects said piston to an upper end of said shock absorber; and
an elastic member positioned coaxial within said first internal chamber;
wherein said dampening fluid flows through said at least one opening and said valve means to slow compression and expansion of said shock absorber.

43. A shock absorber according to claim 42, wherein said first valve means remains open during compression and closed during expansion of said shock absorber.

44. A shock absorber according to claim 42, wherein said elastic member is a spring.

45. A shock absorber according to claim 42, wherein said elastic member is an elastomer.

46. A shock absorber according to claim 42, wherein said second internal chamber has a length proportional to a stroke of said shock absorber.

47. A shock absorber according to claim 42, wherein said plug assembly is axially traversed by said support tube.

48. A shock absorber according to claim 42, wherein said piston divides said second internal chamber into an upper chamber and a lower chamber.

49. A shock absorber according to claim 48, wherein said piston delimits said upper and lower chambers.

50. A shock absorber according to claim 48, wherein said lower chamber is in permanent communication with said first internal chamber.

51. A shock absorber according to claim 48, wherein said second valve means controls flow of said dampening fluid between said upper and lower chambers.

52. A shock absorber according to claim 48, wherein said second valve means is open in compression of said telescopic system and closed in expansion of said shock absorber, and wherein said piston comprises a third valve means which is open in both compression and expansion of said shock absorber.

53. A shock absorber according to claim 52, wherein said third valve means has a flow range which is adjustable by means of an adjustment screw positioned axially within said support tube.

54. A shock absorber according to claim 42, wherein said second internal chamber has at its lower end a means for fastening with lateral seal to a lower end of said shock absorber.

55. A shock absorber according to claim 42, wherein said plug assembly has an external annular recess on which rests said elastic member.

56. A shock absorber according to claim 42, wherein said piston is integrally connected via a bell cap to a lower end of said inner sliding tube.

57. A shock absorber according to claim 56, wherein a second elastic member is positioned coaxially around said second internal chamber between said bell cap and said plug assembly such that said second elastic member provides end-of-stroke expansion dampening of said shock absorber.

58. A shock absorber according to claim 42, wherein said plug assembly has an external diameter less than the inner diameter of said inner sliding tube.

59. A shock absorber according to claim 58, wherein said inner sliding tube has a tapered sidewall such that said first internal chamber has an inner diameter which decreases toward an upper end of said inner sliding tube.

60. A shock absorber according to claim 42, wherein said plug assembly has an external diameter such that said plug assembly slides guided on an internal surface of said inner sliding tube.

61. A shock absorber according to claim 60, wherein said plug assembly comprises openings for providing passage of said dampening fluid during expansion and compression of said shock absorber.

62. A shock absorber according to claim 42, wherein said piston cooperates with lateral seal with said second internal chamber through at least one annular gasket mounted on said piston.

63. A shock absorber according to claim 42, wherein said piston is provided with a threaded axial hole to which said support tube is attached.

64. A shock absorber according to claim 42, wherein said support tube has a screw coaxially positioned therein, said screw being enlarged on its lower end, said enlarged lower end having at least one lateral hole which externally communicates with an internal cavity of said piston and said second internal chamber, and which internally communicates with an internal cavity of said support tube and said second internal chamber.

65. A shock absorber according to claim 64, wherein said inner sliding tube has on its upper end a plug assembly which is axially traversed with lateral seal by said screw.

\* \* \* \* \*